(12) United States Patent
Grieve et al.

(10) Patent No.: US 7,025,903 B2
(45) Date of Patent: Apr. 11, 2006

(54) REFORMER SYSTEM PROCESS

(75) Inventors: Malcolm James Grieve, Fairport, NY (US); Juergen T. Kammerer, Weilach (DE); Amanda M. Weiss, Rochester, NY (US); David Robert Schumann, Spencerport, NY (US)

(73) Assignee: Delphi Technologies, Inc., Troy, MI (US)

( * ) Notice: Subject to any disclaimer, the term of this patent is extended or adjusted under 35 U.S.C. 154(b) by 223 days.

(21) Appl. No.: 09/996,622

(22) Filed: Nov. 29, 2001

(65) Prior Publication Data

US 2002/0150532 A1 Oct. 17, 2002

Related U.S. Application Data

(60) Provisional application No. 60/269,078, filed on Feb. 15, 2001.

(51) Int. Cl.
*C01B 3/22* (2006.01)
*C01B 3/24* (2006.01)
*C01B 3/26* (2006.01)

(52) U.S. Cl. .................. 252/373; 423/648.1; 423/650; 423/651; 423/652; 423/653; 423/654; 429/17

(58) Field of Classification Search ............... 252/373; 423/648.1, 650, 651, 652, 653, 654; 429/17
See application file for complete search history.

(56) References Cited

U.S. PATENT DOCUMENTS

| 5,019,463 | A | 5/1991 | Matsubara et al. ........... 429/12 |
|---|---|---|---|
| 5,733,675 | A | 3/1998 | Dederer et al. ............... 429/19 |
| 5,938,800 | A | 8/1999 | Verrill et al. ............... 48/127.9 |
| 6,214,066 | B1 | 4/2001 | Nataraj et al. |
| 6,423,896 | B1 | 7/2002 | Keegan |
| 6,464,947 | B1 | 10/2002 | Balland |
| 6,481,641 | B1 | 11/2002 | Mieney |
| 6,485,852 | B1 | 11/2002 | Miller et al. |
| 6,486,087 | B1 * | 11/2002 | Saling et al. ............ 423/648.1 |

(Continued)

FOREIGN PATENT DOCUMENTS

EP  0 924 786 A2  6/1998

(Continued)

OTHER PUBLICATIONS

Search report for PCT/US02/04375.

*Primary Examiner*—Wayne A. Langel
(74) *Attorney, Agent, or Firm*—Paul L. Marshall

(57) ABSTRACT

A process for removing contaminants from a reformer comprises removal of particulate matter under operating, or stand-by conditions, or at the start of a shutdown procedure, by introducing a gas mixture to the reformer system having an oxidant-to-fuel ratio concentration leaner than a normal oxidant-to-fuel ratio concentration and at a gas flow rate less than a peak flow rate. The process produces elevated temperatures at the reformer inlet and elevated levels of carbon dioxide and water that combine to remove the contaminants. Another embodiment includes removal of particulate matter during a shutdown procedure by cycling the flow of fuel and air on and off; monitoring an exit temperature of a catalyst substrate and alternatively, cycling the oxidant flow on and off when the exit temperature is less than or greater than a threshold temperature such that the exit temperature of the catalyst substrate is maintained below the temperature at which aging of the catalyst and/or a washcoat material may occur. These methods may be used individually or in combination to improve the durability and performance of the fuel reformer.

27 Claims, 3 Drawing Sheets

U.S. PATENT DOCUMENTS

| | | |
|---|---|---|
| 6,562,496 B1 | 5/2003 | Faville et al. |
| 6,562,502 B1 | 5/2003 | Haltiner, Jr. |
| 6,608,463 B1 | 8/2003 | Kelly et al. |

FOREIGN PATENT DOCUMENTS

| | | |
|---|---|---|
| EP | 1084749 | 3/2001 |
| WO | WO 00/29092 | 5/2000 |
| WO | WO 00/31816 | 6/2000 |
| WO | 0100318 | 1/2001 |
| WO | 0100524 | 1/2001 |
| WO | 0116022 | 3/2001 |
| WO | WO 02/090251 A1 | 11/2002 |

* cited by examiner

REFORMER SYSTEM PROCESS

CROSS-REFERENCE TO RELATED APPLICATION

The present application claims the benefit of the date of earlier filed provisional application, having U.S. Provisional Application No. 60/269,078, filed on Feb. 15, 2001, which is incorporated herein in its entirety.

BACKGROUND OF THE INVENTION

The automotive industry has made very significant progress in reducing automotive emissions. Tighter emission standards and significant innovations in catalyst formulations and engine controls have led to dramatic improvements in the low emission performance and robustness of gasoline and diesel engine systems. This has reduced the environmental differential between optimized traditional fuel systems and alternative fuel systems for automotive vehicles. However, many technical challenges remain to make the internal combustion engine a nearly zero emission system having the efficiency necessary to make the vehicle commercially viable.

The emergence of fuel cell technology as a potential automotive power system has led to interest in producing syngas from transportation fuels such as gasoline and diesel fuels for use in the fuel cell. Syngas is a gaseous fuel containing primarily hydrogen and carbon monoxide. A fuel cell is an energy conversion device that generates electricity and heat by electrochemically combining a gaseous fuel, such as syngas, and an oxidant, such as air or oxygen, across an ion-conducting electrolyte. The fuel cell converts chemical energy into electrical energy. Fuel cells generally consist of at least two electrodes positioned on opposite sides of an electrolyte. The oxidant passes over the oxygen electrode (cathode) while the fuel passes over the fuel electrode (anode), generating electricity, water, and heat. The fuel stream that is supplied to the anode includes hydrogen. For example, the fuel stream may be a gas such as substantially pure hydrogen or a reformate stream containing hydrogen. The oxidant stream, which is supplied to the cathode, comprises oxygen, such as substantially pure oxygen, or a dilute oxygen stream such as air.

Solid oxide fuel cells (SOFC) are constructed entirely of solid-state materials, utilizing an ion conductive oxide ceramic as the electrolyte. A fuel cell stack commonly includes numerous inlet ports and supply manifolds for directing the fuel and oxidant to a plurality of anodes and cathodes respectively. The stack often also includes an inlet port and manifold for directing a coolant fluid to interior passages within the stack to absorb heat generated by the exothermic reaction in the fuel cells. The stack also generally includes exhaust manifolds and outlet ports for expelling the unreacted fuel and oxidant gases, as well as an exhaust manifold and outlet port for the coolant stream exiting the stack.

In a typical SOFC, a fuel flows to the anode where it is oxidized by oxide ions from the electrolyte producing electrons that are released to the external circuit. The reaction also produces water and carbon dioxide. At the cathode, the oxidant accepts electrons from the external circuit to form oxide ions. The oxide ions migrate across the electrolyte to the anode. Each individual electrochemical cell generates a relatively small voltage. The flow of electrons through the external circuit provides for consumable or storable electrical power. Higher voltages are attained by electrically connecting a plurality of electrochemical cells in series to form a stack.

An SOFC can be used in conjunction with a reformer system that catalytically converts a hydrocarbon fuel to a reformate stream of hydrogen and carbon monoxide. The reformate stream is then fed into the fuel cell to generate electricity for use or storage. Different types of reformer technologies include steam reformers, dry reformers, and partial oxidation reformers.

Steam reforming systems involve the use of a fuel and steam mixture that is reacted in heated tubes filled with catalysts to convert the fuel into principally hydrogen and carbon monoxide. The steam reforming reactions are endothermic, thus the steam reforming systems are designed to transfer heat into the catalytic process. An example of a steam reforming reaction is illustrated in Equation I.

$$CH_4 + H_2O \rightarrow CO + 3H_2 \qquad \text{I.}$$

Partial oxidation reformers are based on substoichiometric combustion to achieve the temperature necessary to reform the fuel. Decomposition of the fuel to primarily hydrogen and carbon monoxide occurs through thermal reactions at temperatures ranging from about 700° C. to about 1,000° C. Catalysts have been used with partial oxidation systems to promote conversion of various sulfur-free fuels, such as ethanol, into synthetic gas. The use of a catalyst accelerates the reforming reaction and lowers the reaction temperature required. An example of a partial oxidation reforming reaction is shown in Equation II.

$$CH_4 + \tfrac{1}{2}O_2 \rightarrow CO + 2H_2 \qquad \text{II.}$$

Dry reforming involves the creation of hydrogen and carbon monoxide in the absence of water, for example, using carbon dioxide as the oxidant. Dry reforming reactions, like steam reforming reactions, are endothermic processes. An example of a dry reforming reaction is depicted in Equation III.

$$CH_4 + CO_2 \rightarrow 2CO + 2H_2 \qquad \text{III.}$$

Practical reformers may use a combination of these processes. By using a combination of these processes, the temperature of the reforming process can be manipulated. For example, increasing the amount of air or decreasing the amount of endothermic oxidants, i.e., water, carbon dioxide, supplied to the process, will increase the reformer temperature.

On-board reforming of gasoline and diesel fuels is difficult because of the wide variety of fuel components, additives and contaminants found in these fuels. These fuels are difficult to fully vaporize and contain compounds that readily form soot and other carbonaceous matter as well as sulfur bearing matter. The catalysts used in the reformer systems are sensitive to sooting and contamination. When sooting occurs, the active catalyst material can be fully or partially deactivated adversely affecting the efficiency and operating lifetimes of the reformer system. Moreover, the soot, formed primarily from carbon, can react exothermically when exposed to an oxidant such as air. A rapid increase in temperature may cause melting and destruction of the catalyst support as well as a loss of the precious metal material that makes up the catalyst material.

Moreover, since rapid start-up and shut down cycles are typical in automobile applications, the reformer catalyst bed must be heated rapidly. However, the air/fuel mixing zone must be carefully controlled in temperature to avoid gas phase reactions in the mixing zone of the reformer system.

Particularly when using reactive fuels like gasoline or diesel fuels, gas phase reactions tend to produce lower quality reformate having more soot, and less hydrogen. This proves to be inefficient because soot build-up can rapidly impair reformer performance as well as components disposed downstream.

SUMMARY OF THE INVENTION

Disclosed herein are processes for operating and removing contaminants from reformer systems. In one embodiment, a process for operating a reformer system comprises introducing a gas mixture to the reformer system; increasing a proportion of an oxidant in the gas mixture and controlling a flow rate of the gas mixture; and reacting the gas mixture to form a reformate stream and to increase a temperature in the reformer system, wherein the temperature is effective to remove a contaminant from the reformer system.

In another embodiment, a process for operating a reformer system comprises introducing a gas mixture to the reformer system and contacting the oxidant and gas mixture with a catalyst material disposed at an inlet to the reformer system to generate a reformate stream and to increase a temperature in the reformer system, wherein the temperature effective to remove a contaminant from the reformer system; monitoring the temperature of the reformer system; increasing a proportion of an oxidant in the gas mixture and controlling a flow rate of the gas mixture to produce a peak operating temperature in the reformer system at a distance of less than or equal to about 10 millimeters from the inlet; reducing the flow rate of the gas mixture to zero and flowing the oxidant into the reformer system when the temperature is less than or equal to a first temperature; and reducing the flow of the oxidant to zero when the temperature is greater than or equal to a second temperature, wherein the second temperature is greater than the first temperature.

In another embodiment, a process for operating a reformer system comprises monitoring a temperature of the reformer system; reducing the flow of a gas mixture into the reformer system to zero when the temperature of the reformer system greater than or equal to a first temperature; flowing an oxidant into the reformer system when the temperature of the reformer system less than or equal to a second temperature; reducing the flow of the oxidant when the temperature is greater than or equal to the first temperature; repeating flowing the oxidant into the reformer system and reducing the flow of the oxidant to zero until the temperature is at a third temperature that remains at or below the first temperature; and shutting down the reformer system when the temperature remains at or below the third temperature.

The above described and other features are exemplified by the following figures and detailed description.

BRIEF DESCRIPTION OF THE DRAWINGS

Referring now to the figures wherein the like elements are numbered alike.

DESCRIPTION OF THE PREFERRED EMBODIMENT

Figure 1:
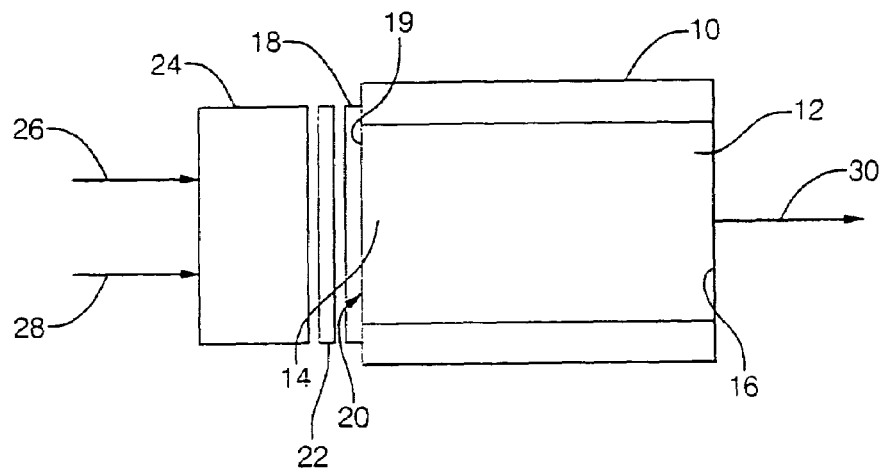
FIG. 1 is a schematic of a fuel reformer system.

Removal of contaminants (e.g., carbon, soot, and the like) from a reformer system, during operation or during a first phase of a reformer system shut down, can comprise maintaining a catalyst substrate within the system at a temperature greater than the normal operating temperatures for that particular reformer system (e.g., a catalyst substrate temperature less than or equal to about 150° C. greater than normal operating temperature for the reformer system, with a catalyst substrate temperature of about 50° C. to about 150° C. greater than normal operating temperature preferred, and a temperature of about 75° C. to about 125° C. greater than normal operating temperature especially preferred, wherein the normal operating temperature of the catalyst susbtrate is typically about 750° C. to about 950° C. for most reformer systems). Maintaining the temperature greater than the normal operating temperature can be attained by controlling the fuel to air (f/a) equivalence ratio ($\phi$, further explained below) and the flow rate of the other oxidants used (e.g., air, water, carbon dioxide, and the like, or combinations comprising at least one of the foregoing oxidants). Alternatively, the temperature may be maintained above the normal operating temperature by adjusting the rate of heat transferred into the reformer. For example, if the reformate flow rate is maintained at a low level relative to its rated value and $\phi$ is maintained at a leaner than normal operating ratio, then the catalyst bed can be controlled to the desired temperature and the reformer product composition will contain elevated levels of carbon dioxide and water. This allows carbon (or other particulate) to be removed from the catalyst bed, particularly at the leading edge of the catalyst substrate. A low oxidant flow rate, for example, is a rate of less than or equal to about 50% of a peak oxidant flow rate. Preferably, the oxidant flow rate is less than or equal to about 40% of the peak flow rate, with less than or equal to about 33% of the peak flow rate more preferred. The peak flow rate ($F_p$) is the flow rate for which the reformer has been designed (e.g., a flow rate at which greater than or equal to about 90% of the hydrogen and carbon in the gas are converted to hydrogen and carbon monoxide). Consequently, the peak oxidant flow rate is the oxidant flow rate at the peak flow rate.

By controlling the f/a equivalence ratio and the oxidant flow rate, the overall temperature of the catalyst can be increased, and the reforming temperature can be attained within the catalyst substrate at closer to the catalyst substrate inlet than under normal high flow rate conditions (i.e., peak flow rate). Essentially, at the peak flow rate, a reforming temperature is attained at a distance of about 10 millimeters (mm) from the inlet of the catalyst substrate (e.g., from the mat/substrate interface). By controlling the f/a equivalence ratio, the reforming temperature can be attained closer to the catalyst substrate inlet, e.g., at a distance of less than 10 mm from the inlet, with a distance of less than or equal to about 8 mm preferred, and a distance of less than or equal to about 7 mm more preferred, a distance from the inlet of less than or equal to about 5 mm especially preferred.

The f/a equivalence ratio ($\phi$) is mathematically defined by Equation IV.

$$\phi = \frac{\left(\frac{f_a}{a_a}\right)}{\left(\frac{f_s}{a_s}\right)}. \qquad \text{IV}$$

where: $f_a$=fuel actual
 $a_a$=air actual
 $f_s$=fluid stoichiometric
 $a_s$=air stoichiometric Partial oxidation reformers are typically operated on the lean side of a syngas ratio to complete the conversion of hydrocarbons and to minimize the production of soot. The term "syngas ratio" is hereinafter defined as the equivalence ratio, wherein sufficient oxygen is available to convert all of the carbon species to carbon monoxide while converting all of the hydrogen atoms in the system to molecular hydrogen. For example, for a gasoline partial oxidation reformer with a catalyst having a 63 millimeter (mm) diameter, a φ of about 2.1 may be used at an airflow rate of 0.65 grams per second (g/s) (at the low flow rate for particulate removal), compared to the syngas ratio at φ of about 2.9 and compared to a normal equivalence ratio of about 2.7 at 1.5 g/s (corresponding to its rated capacity). Although the example generally refers to partial oxidation reformers, other applicable strategies include autothermal or endothermic reforming processes.

Once the desired amounts of contaminants (e.g., carbon and the like) have been removed from the reformer at the elevated temperature, the reformer may again be operated at the peak flow rates or the reformer can be shut down. During shut down, it is preferable to further remove contaminants from the reformer to enable efficient operation upon subsequent start-up. Further removal of contaminants is preferably accomplished by reducing the total flow rate to or near the minimum value for the reformer (i.e., less than about 30% of the rated mass flow rate), then setting the fuel rate to zero while cycling the oxidant flow rates between zero and a low value based on thresholds estimated or measured from the temperature of the catalyst substrate or at the reformer outlet. By cycling the oxidant flow rate, e.g., from a first flow rate to a zero flow rate to a second flow rate back to a zero flow rate, and so on, remaining contaminants (e.g., carbon, and the like) in the reformer can be burned without adversely effecting the structural integrity of the reformer.

For example, the fuel flow can be ceased and the oxidant flow rate can be cycled as is set forth in Table I. The temperatures employed in this mode are below the normal operating temperature of the reformer catalyst. The temperatures are limited by the stability of the catalyst materials in a net oxidizing environment because the catalyst materials can oxidize and/or migrate into a washcoat material when exposed to oxygen at higher temperatures.

TABLE I

| Mode | oxidant flow rate (g/s) | $T_e$ and (next mode) |
| --- | --- | --- |
| (a) burn-off | | |
| 1st | (about 0.15 to about 0.30)$F_{op}$ | ≧800° C.[1] (b) |
| 2nd | (about 0.20 to about 0.35)$F_{op}$ | ≦720° C. (c) |
| 3rd | (about 0.25 to about 0.40)$F_{op}$ | |
| 4th | (about 0.30 to about 0.45)$F_{op}$ | |
| 5th | (about 0.35 to about 0.50)$F_{op}$ | |
| 6th | (about 0.40 to about 0.55)$F_{op}$ | |

TABLE I-continued

| Mode | oxidant flow rate (g/s) | $T_e$ and (next mode) |
| --- | --- | --- |
| 7th ... | (about 0.45 to about 0.60)$F_{op}$ ... | |
| (b) cool off | 0 | ≦775° C.[2] |
| (c) final burn-off | ≦$F_{op}$ | ≦700° C.[3] |

$F_{op}$ = peak oxidant flow rate
$T_n$ = normal operating temperature
$T_e$ = catalyst exit temperature
[1]preferably ≦950° C.
[2]preferably ≦750° C.
[3]preferably ≦650° C.

In other words, oxidant can be introduced at an initial flow rate sufficiently below the peak oxidant flow rate to burn off contaminants in a controlled fashion, e.g., without an uncontrollable temperature spike that can adversely affect the catalyst. Once the burning causes the catalyst substrate to reach a predetermined heated temperature (e.g., a temperature below the temperature that will adversely affect the catalyst substrate structural integrity and/or the catalyst (e.g., generally below about 1,000° C.; as is determined by the catalyst exit temperature)), the oxidant flow is ceased to allow the catalyst substrate to cool (as is determined by the catalyst exit temperature). The heated temperature is preferably below the normal operating temperature for the particular reformer, and more preferably, the heated temperature is about 50° C. to about 100° C. below the normal operating temperature (as is determined by the catalyst exit temperture). Meanwhile, the cool down temperature is preferably less than or equal to about 775° C., with less than or equal to about 750° C. more preferred, and less than or equal to about 720° C. even more preferable.

Once the cooled temperature is attained, the oxidant flow is again started, preferably at a subsequent flow rate that is greater than the initial flow rate yet sufficiently below the peak flow rate to burn off contaminants in a controlled fashion. The degree of increase between the initial flow rate and the subsequent flow rate can be at a preset interval (e.g., 0.5 g/s), based upon the amount of contaminants in the reformer, and/or can be based upon the amount of time required to attain the desired heated temperature. For example, if the exit temperature is attained quickly (e.g., in less than or equal to about 5 seconds), the increase in the flow rate from the initial rate to the subsequent rate will be smaller than if the exit temperature is attained slowly (e.g., in greater than or equal to about 30 seconds).

The burn-off/cool cycling is maintained until, during the burn-off cycle, the catalyst substrate exit temperature fails to exceed a predetermined minimum temperature (e.g., a temperature less than or equal to the cool down temperature, for example a temperature of about 750° C., with a temperature of about 720° C. preferred; alternatively, a temperature greater than or equal to about 50° C. below the normal operating temperature can be employed, with a temperature greater than or equal to about 100° C. below the normal operating temperature preferred. Once this occurs, it is preferable to employ a final burn-off. The final burn-off can occur at an oxidant flow rate less than the rated (peak) oxidant rate.

The oxidant flow rates employed during the sequential cycling can be based upon time intervals that are predetermined for a given type of fuel, or based upon sensor inputs, namely temperature sensors, that monitor the temperature of the catalyst (e.g., based upon the temperature of the gas at the catalyst substrate exit or upon an estimate of the temperature based on models of the catalyst substrate temperature and operating conditions). When the catalyst temperature increases to a predetermined level (e.g., greater than or equal to about 800° C.), the gas flow can be reduced (preferably ceased), and when the catalyst temperature decreases to a second predetermined level (e.g., less than or equal to about 700° C.), the oxidant flow can be increased (or restarted). Upon each subsequent cycle, the oxidant flow rate can be increased, allowing a higher degree of burning of contaminants within the catalyst to occur during subsequent cycles. Since the quantity of contaminants available during subsequent cycles is reduced from the initial quantity, the amount of heat produced during the subsequent cycles is reduced and the amount of air available is increased to attain the desired temperature to attain the contaminant removal. By employing this sequential process, greater than or equal to about 80% by weight of contaminants (i.e., soot and carbon) present upon commencing the sequential process can be removed from the catalyst substrate, with removal of greater than or equal to about 90% of contaminants common, and removal of greater than or equal to about 95% of contaminants attainable.

Referring now to the drawings and to FIG. 1 in particular, one embodiment of a reformer system is illustrated; generally designated by reference numeral 10. The reformer system 10 includes a reforming catalyst substrate 12 having an inlet 14 and an outlet 16. A mat material 18 is disposed upstream of inlet 14. In order to improve the insulative qualities of the mat material 18, the mat material preferably includes a reflective surface 20 facing the inlet 14. Optionally, the reformer system 10 includes a flame arrestor 22 upstream of the mat material 18. In addition, or as an alternative to the flame arrestor 22 and the reflective surface 20, an inert material 24, preferably having a cross-sectional geometry substantially similar to the mat material 18 cross-sectional geometry, is disposed in fluid communication and, preferably, in physical contact with either the optional flame arrestor 22 or mat material 18. Fuel and oxidant conduits 26, 28, respectively, are fluidly connected to the inert material 24, which is in fluid communication in the with the reformer catalyst substrate 12, with reformate carrying conduit 30 fluidly connected to outlet 16.

In operation, fuel and oxidant flow through conduits 26 and 28, respectively, passing through the mat material 18. Prior to entering the substrate 12, the gas is optionally heated. Within the substrate 12, the fuel and oxidant (e.g., air, water, or the like) catalytically react to form a reformats stream. The reformate then exits the system 10 through the reformate carrying conduit 30.

The mat material 18 preferably functions as an insulator, a radiation shield, and a filtration device. Preferably, the mat material 18 further comprises flame-arresting properties. The configuration of the mat material 18 is not intended to be limited to any particular design. The mat material can have any cross-sectional geometry including, but not limited to, rounded, (e.g., circular, elongated, oval, oblong, and the like), multisided (e.g., triangular, square, trapezoidal, pentagonal, hexagonal, heptagonal, and the like) and the like. Preferably, the mat material 18 includes a geometry resembling, or substantially resembling, the cross-sectional geometry of either the reformer catalyst substrate inlet 14 or the cross-sectional geometry of the catalyst substrate 12.

The mat material 18 is preferably formed from an interconnecting network of self-supporting fibrous materials or fibrous materials, and may consist of one or more layers. Suitable fibrous materials may include woven and non-woven fibers, which includes chopped fibers, short fibers, long fibers, and the like. Preferably, the fibrous materials include a plurality of long fibers (some of which may be continuous across the width of the mat material) such that the fibers are entangled to impart structural integrity sufficient to withstand the force exerted by the gas flow upon the mat material 18. That is, the mat material 18 should be capable of maintaining its structural integrity during gas flow without individual fibers being dislodged and swept downstream with the gas flow, while also possessing a porosity sufficient to filter particulate matter while minimally inhibiting gas flow and may be formed of a single layer or formed of several layers. The layers may be woven, non-woven preform, mesh, fibrous, cloth or paper-like material. Preferably, the mat material 18 is fabricated using a binder such as a sealing agent, an adhesive, a ceramic binder, combinations comprising at least one of the foregoing, and the like. Suitable ceramic binders include colloidal alumina and the like.

The porosity of the mat material 18 is selected to filter particulate matter while minimally inhibiting gas flow, whereas thickness of the mat material 18 is based upon the desired structural integrity and fluid flow requirements for the particular application. In general, a thinner mat material offers a lower pressure drop and minimizes parasitic losses within the system whereas a thicker mat material allows more reactive fuels, such as diesel, to be reformed without structural degradation of the mat material 18. In general, thicknesses less than or equal to about 10 mm can be employed in the reformer system with less than or equal to about 5 mm preferred, and less than or equal to about 3 mm especially preferred. Also preferred are thicknesses greater than or equal to about 0.50 mm.

The mat material 18 reduces the likelihood that high temperatures of the reforming zone from heating the incoming gas flow will cause a premature gas phase reaction prior to entering the reformer catalyst substrate thereby enhancing reformer efficiency. Since a gas phase reaction is more likely to occur when the reformate flow rate is low, the mat material 18 is designed to reduce the likelihood that a gas phase reaction will occur at low flow rates by thermally isolating the inlet 14. While not wanting to be bound by theory, it is believed that the thickness of the mat material 18 assists in containing the reaction within the reformer catalyst bed by radiating heat and temperature back into the catalyst substrate 12 and improving the turn down ratio. The turn down ratio is defined as the ratio of the maximum to minimum reformate flow rate which can be reliably produced, i.e., the peak power flow rate of the reformate flow divided by the idle flow rate of the reformate flow.

Preferably, the mat material 18 is formed from materials that are stable in both oxidizing and reducing reaction conditions. Suitable materials include metal oxides (e.g., alumina, zirconia, silica, magnesia, titania, and the like), metallic materials (e.g., stainless steel, super alloys, intermetallic compounds, and the like), and combinations comprising at least one of the foregoing materials. Preferably, the mat material 18 is fabricated using a binder such as a sealing agent, an adhesive, a ceramic binder, a combination including at least one of the foregoing binders, and the like. For example, a suitable ceramic binder includes colloidal alumina.

In a preferred embodiment, the reflective surface of the mat material 18 is disposed adjacent the substrate 12. The reflective surface 20 acts as a radiation reflector or radiation barrier to prevent sharp temperature gradients from forming upstream of the mat material 18 that may be sufficient to cause a premature gas phase reaction. The reflective surface 20 preferably comprises a thermally resistant material overlying the mat material or alternatively, is a thermally resistant coating deposited onto all or a portion of the surface. The reflective surface 20, which preferably comprises the same composition as the mat material 18, can include metal oxides, such as alumina, zirconia, silica, magnesia, titania, and the like, as well as combinations comprising at least one of the foregoing oxides. The mat material 18 with its reflective surface 20 is preferably effective to maintain a temperature gradient from about 230° C. to about 600° C. (dependent upon the reactivity of the fuel) between the inlet and outlet of the mat material 18.

Disposing an optional secondary flame arrestor 22 between the mat material 18 and the inert material 24 can attain further thermal management. Flame arrestors comprise a heat conductive, metallic material that is disposed near the inlet of the reformer catalyst substrate to quench potential flames that occur due to gas phase reactions. Flame arrestor 22, which preferably has a geometry resembling, or substantially resembling, the geometry of the reformer catalyst substrate inlet 14 and mat material 18, can comprise ferrous materials (e.g., stainless steel, and the like) super alloy, copper, nickel, aluminum, and the like, as well as alloys and combinations comprising at least one of the foregoing materials. The flame arrestor 22, mat material 18 and reflective surface 20 combine to produce a thermal barrier and prevent high temperatures of the reforming zone from heating the incoming gas flow and causing premature gas phase reactions.

Preferably disposed upstream of the flame arrestor 22 is the inert material 24, which imparts further structural integrity to the mat material 18. The inert material is preferably a foam or sponge-like material having a fine porosity that exhibits low restriction to gas flow. More preferably, the inert material 24 is selected to allow time for the evaporation and mixing of any remaining liquid fuel. The inert material 24 may be fabricated from ceramic materials (e.g., alumina, zirconia, silica, silicon carbide, and the like), polymeric materials, metallic materials (e.g., ferrous materials (e.g., stainless steel, and the like), super alloy, copper, nickel, aluminum) and the like, as well as alloys, cermets, oxides, composites and combinations comprising at least one of the foregoing material. More preferably, the inert material 24 is constructed from alumina or silicon carbide. For example, the inert material 24 can be formed by depositing silicon carbide onto a fugitive polymeric material having a skeletal sponge-like structure and firing it to burn off the polymeric material leaving a silicon carbide foam-like structure.

As previously described, the mat material 18 is preferably disposed upstream, in fluid communication with, and preferably adjacent to inlet 14 of the reformer catalyst substrate 12. The reformer catalyst substrate comprises any material designed for use in a reformer environment and preferably, comprises the following characteristics: (1) capable of operating at temperatures up to about 1,000° C.; (2) capable of withstanding reducing and oxidizing environments containing for example, hydrocarbons, hydrogen, carbon monoxide, water, oxygen, sulfur, sulfur compounds, combustion radicals such as H+, OH− and the like, and carbon particulate matter; and (3) has sufficient surface area and structural integrity to support the desired catalyst. Some possible materials include ceramics, (e.g., cordierite, silicon carbide, alumina, zirconia) or metallic alloys (e.g., stainless steel, nickel based superalloys, intermetallic compounds, and the like) as well as oxides, alloys, cermets and mixtures comprising at least one of the foregoing materials, with alumina, zirconia and mixtures comprising at least one of the foregoing preferred.

Although the reformer catalyst substrate 12 can have any size or geometry, the size and geometry are preferably chosen to optimize the surface area in the given catalytic converter design parameters. The reformer catalyst substrate 12 can be in the form of a porous glass, foil, sponge, monolith, and the like. It can have an open cell foam structure, or an extruded honeycomb cell geometry with the cells being any multi-sided or rounded shape, with substantially square, hexagonal, octagonal or similar geometries preferred due to increased surface area and structural integrity. The reformer catalyst substrate 12 is formed into a cell structure with a plurality of cells arranged in a honeycomb pattern using a foam process, or the like.

Disposed on and/or throughout the reformer catalyst substrate can be a catalyst material (not shown). The catalyst material may comprise one or more catalyst materials that are wash coated, imbibed, impregnated, physisorbed, chemisorbed, precipitated or otherwise applied to the catalyst substrate. Possible catalyst materials include metals such as platinum, palladium, rhodium, iridium, osmium, ruthenium, tantalum, zirconium, yttrium, cerium, nickel, copper, and the like, as well as oxides, mixtures and alloys comprising at least one of the foregoing materials.

Optionally, the catalyst material can be supported on a high surface area support. Various supports can be employed, including alumina, zirconia, magnesia, silica, and the like, mixed with additives that may include, rare earth metals (e.g., cerium, lanthanum, and the like), alkaline earth metals (e.g., barium, and the like) and transition metals (e.g., nickel, and the like), and the like, as well as alloys, oxides and combinations comprising at least one of the foregoing supports, with alumina and zirconia preferred. Generally, the support can be employed in the catalyst washcoat in an amount up to about 300 grams per cubic foot of reformer catalyst substrate volume.

The catalyst materials can be employed for fuel reforming in a reformer system to convert the hydrocarbon fuel or an oxygenated fuel (such as methanol) into a reformate stream (e.g., hydrogen and carbon monoxide) and byproducts (e.g., carbon dioxide and water). Possible sources of fuel include fuels such as hydrocarbon fuels, including, but not limited to, liquid fuels, such as gasoline, diesel, ethanol, methanol, kerosene, and others; gaseous fuels, such as natural gas, propane, butane, and others; and alternative fuels, such as hydrogen, biofuels, dimethyl ether, and others; and synthetic fuels, such as synthetic fuels produced from methane, methanol, coal gasification or natural gas conversion to liquids, and combinations comprising at least one of the foregoing methods, and the like; and combinations comprising at least one of the foregoing fuels. The fuel utilized in the system is chosen based upon the application, expense, availability, and environmental issues relating to the fuel. The preferred fuel is based upon the power density of the engine, with lighter fuels (e.g., those that can be more readily vaporized and/or fuels which are readily available to consumers) generally preferred.

The reformer system 10 can comprise one or several reformers preferably operated in series. For example, a main reformer can be used in conjunction with and downstream from a micro-reformer. The micro-reformer is preferably sized to provide sufficient heat (in a full combustion mode) and sufficient reformate (in the reforming mode) to pre-heat and start-up the downstream device in the desired period of time.

Fuel cells, e.g., SOFC, can be used in conjunction with a reformer system to generate electricity for use or storage. Application of a SOFC in a transportation vehicle imposes specific temperature, volume, and mass requirements, as well as "real world" factors such as fuel infrastructure, government regulations, and cost to be a successful product. The SOFC power generation system can optionally be designed to focus on the power output necessary to serve as an auxiliary power unit (APU) on-board and not as the prime energy source of the vehicle. The efficient operation of the SOFC system permits electrical power to be generated on-board a vehicle even when the primary internal combustion engine is not operating (which will be used to meet "no-idle" emissions laws being enacted in global regions).

Figure 2:
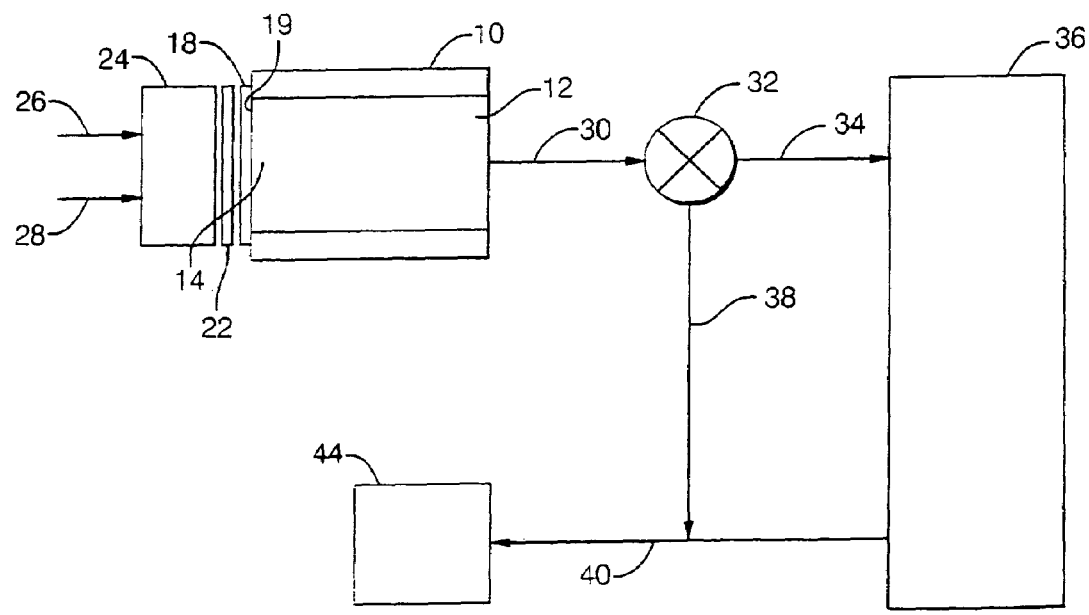
FIG. 2 is a schematic of an energy conversion device employing the reformer system of FIG. 1.

Referring now to FIG. 2, a schematic of an energy conversion device 36 employing the reformer system 10 is depicted. The energy conversion device 36 in this exemplary embodiment is a solid oxide fuel cell (SOFC) having a multi-layer ceramic/metal composite structure designed to produce an electrical signal at an operating temperature of about 600° C. to about 1,000° C. Although described in connection with a SOFC, it is to be understood that a fuel cell having a fuel cell stack portion integrated with a waste energy recovery portion can be employed with any type of fuel cell such as solid oxide, proton exchange membrane (PEM), phosphoric acid, molten carbonate, and the like.

The solid oxide fuel cell 36 comprises one or more multi-cell modules that are mounted to a common gas distribution manifold. Each module of the solid oxide fuel cell 36 produces a specific voltage that is a function of the number of cells in the module. Electrical attachment of the fuel cell 36 is accomplished by way of electrodes at the base and top of each module to a vehicle power bus and system (not shown). The output voltage and current is controlled by the combination of these modules in series and parallel electrical connections, the air/fuel control system, and the electric load applied to the fuel cell system.

The reformer system 10 processes fuel and oxidant into reformate for use with the solid oxide fuel cell 36. The fuel and oxidant flow through conduits 26, 28 and are mixed together in a mixing zone (not shown) before flowing through the temperature and reaction management system comprising the optional inert material 24, optional flame arrestor 22 and mat material 18 prior to entering the reformer catalyst substrate 12. The directional flow of the fuel and oxidant exerts a positive pressure force against the inert material 24, flame arrestor 22 and mat material 18 to support these components against the inlet 14 of the reformer catalyst substrate 12. The use of the inert material 24 filters and removes liquid droplets and/or particulate-forming matter that may be present in the fuel and oxidant.

Meanwhile, the mat material 18 and its reflective surface 20 reflect radiation emanating from the interior of the reformer catalyst substrate 12 back into the substrate. As a result, a sharp temperature gradient exists at the inlet 14 of the substrate 12. The temperature is greater in the interior of the catalyst substrate 12 relative to the exterior. The insulative and thermal reflecting properties of the mat material 18 prevent a premature gas phase reaction from occurring before the fuel enters the reformer catalyst substrate 12. Premature gas phase reactions of the fuel will undesirably cause coking and soot formation in the fuel flow. If this were to occur, soot can then enter the reformer system 10 and degrade the reformate processing ability and efficiency.

Reformate exits the reformer system 10 via conduit 30 and passes through control valve 32. Control valve 32 diverts the reformate flow into either the solid oxide fuel cell 36 via conduit 34 to power the system or into a waste energy recovery assembly 44 using conduits 38 and 40. The solid oxide fuel cell 36 uses reformate to create electrical energy and waste byproducts. Thermal energy can optionally be recovered in the waste energy recovery assembly 44, which can recycle the flow of fuel and waste heat to the fuel reformer and can also discharge a flow of reaction byproducts (e.g., water and carbon dioxide).

The waste energy recovery assembly 44 converts the unused chemical energy (e.g., reformate) and thermal energy (exothermic reaction heat from the SOFC stack 36) to input thermal energy for the fuel cell system through the use of an integration of catalytic combustion zones and heat exchangers. The waste energy recovery assembly 44 can be a series of connected thermal exchange structures (e.g., plates, tubes, and the like) having one or more openings (or manifold passages) that border the edge of the plates, for example, for the flow of oxidant, reformate, and/or exhaust gases. The total number of plates forming a waste energy recovery assembly 44 can range from two to several hundred, depending on space and weight restrictions, and the like.

The control valve 32 may also be used to divert the reformats flow from the solid oxide fuel cell 36 to the waste energy recovery assembly 44 during modes such as for removal of particulate matter from the reformer. Diverting the reformats flow is especially useful if the anode material in the solid oxide fuel cell 36 is prone to oxidation at normal operating temperatures.

Figure 3:
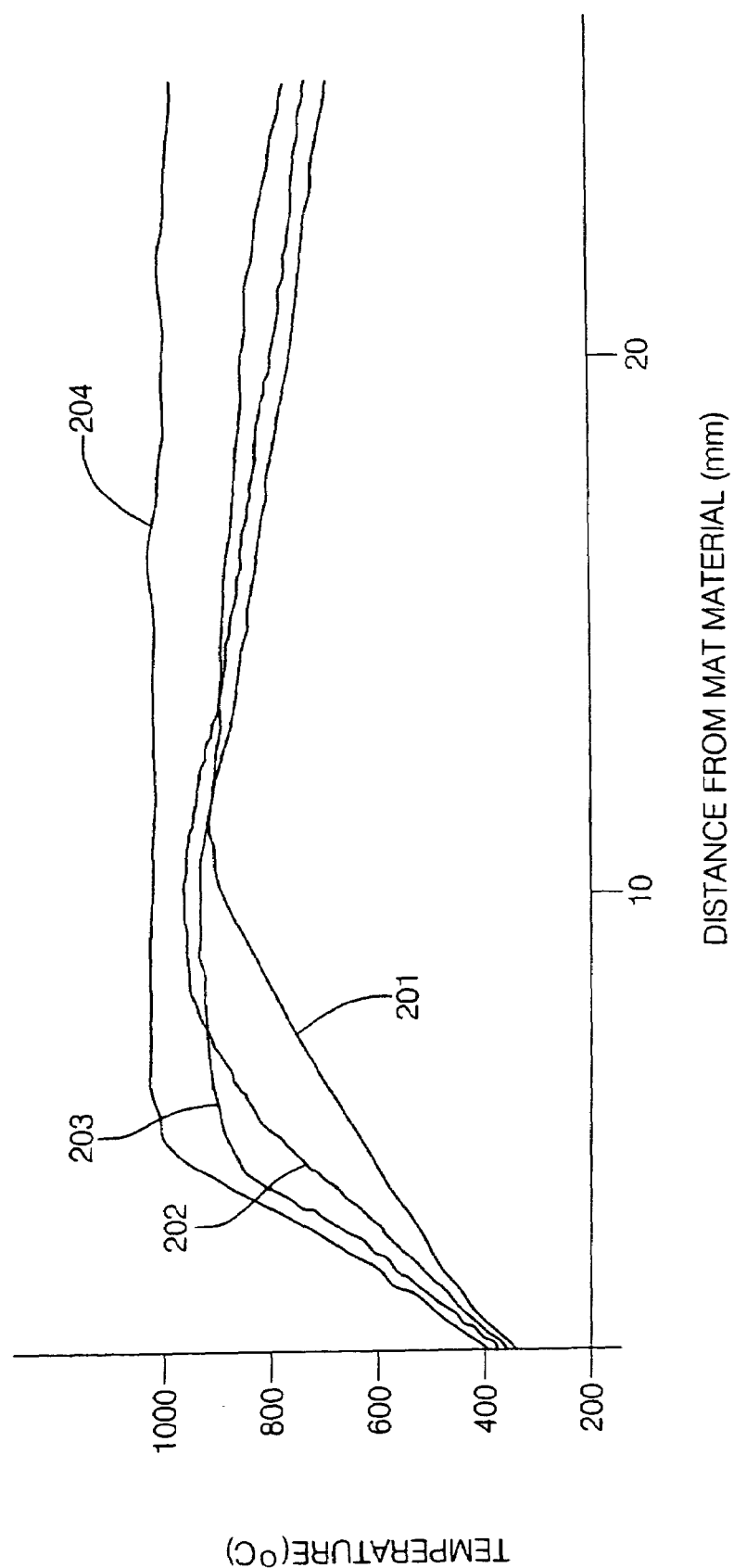
FIG. 3 is a graphical illustration of a temperature profile within a catalyst substrate of a reformer system.

FIG. 3 graphically depicts exemplary temperature profiles within the interior of the catalyst substrate 12 as a function of distance from a leading edge 19 of the mat material 18 for different operating conditions. The mat material 18 is located at the inlet 14 of the reformer catalyst substrate 12. Curve 201 represents the temperature profiles at high reformate flow rates (e.g., flow rates of greater than or equal to about 1.5 g/s for a gasoline partial oxidation reformer having a 63 mm diameter). Reformer reaction rates are slow relative to the high velocity of reactants in curve 201 causing peak catalyst temperatures to occur at a distance in excess of about 10 mm from the leading edge 19 of the mat material 18, well into the interior of the reformer catalyst substrate 12. Consequently, the forward section of the reformer catalyst substrate 12 experiences a lower temperature and is prone to being fouled by carbonaceous particulate matter, e.g., soot, (as the initial reforming reactions occur at a lower than optimal temperature). In contrast, curves 202, 203 and 204 show the temperature profiles at much lower reformate flow rates relative to curve 201 (e.g., 1.2, 0.9 and 0.6 g/s respectively, resulting in progressively leaner $\phi$). The $\phi$ is preferably made progressively leaner to regulate the temperature within the catalyst substrate and to account for heat transfer losses.

In these examples, the peak temperature of the reforming reaction occurs at about 5 to about 7 mm from the mat material 18. As a result, the catalyst substrate 12 is less prone to sooting. Moreover, soot and other particulate matter may be removed from the leading edge 19 of the catalyst substrate 12. It is preferred that the fuel mixture flow at a rate effective to generate a peak temperature in the catalyst substrate 12 at a distance of less than or equal to about 10 mm from the leading edge of the mat material, with a distance of less than or equal to about 8 mm more preferred, with a distance of less than or equal to about 7 mm even more preferred, and a distance of less than or equal to about 5 mm especially preferred.

Accordingly, the process preferably includes operating the reformer system 10 at a low airflow rate (e.g., less than or equal to about one third of the peak airflow rate). At this low airflow rate, the reformer can be operated with less excess fuel than the syngas ratio, and the temperature profile is such that the temperature within the catalyst substrate 12 is fairly uniform, i.e., the peak temperature is substantially uniform and is at a minimal distance from the leading edge 19 of the mat material 18 as is illustrated by curve 204 in FIG. 3.

The elevated temperature at the reformer inlet and the elevated levels of carbon dioxide and water in the reformer product causes carbon deposits on the catalyst to be partially oxidized and burned off. The process can end after a period of time (for example, 30 seconds) or may continue for an extended period of time (even up to several hours) in a stand-by mode, a cool-down mode, or in a regeneration mode, for downstream devices such as sulfur and particulate traps. The process may also be used periodically during reformer operation to refresh the reformer catalyst by removing carbonaceous particulate matter.

Figure 4:
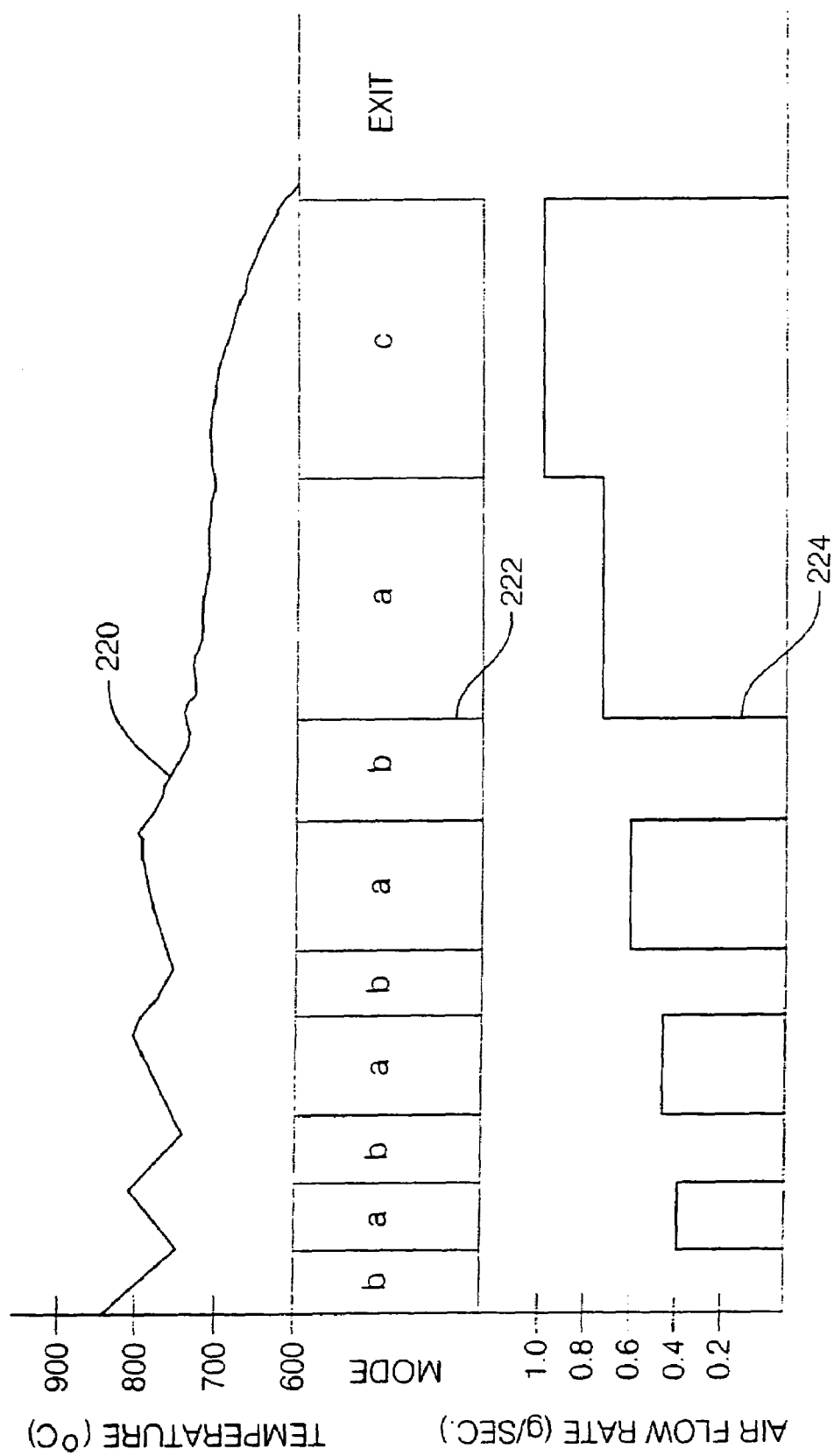
FIG. 4 is a graphical illustration of a temperature profile as a function of fuel and oxidant flow rate.

FIG. 4 graphically depicts a shutdown process flow for further minimizing soot contamination in the reformer catalyst substrate 12. Although the shutdown process flow is detailed for a single reformer device 10, the same steps can be used for shutdown of individual reformers connected in series. A computer (not shown) may be used to program the steps of the process and is well within the skill of those in the art.

The process includes further decreasing the air and fuel flow rates and then turning off the fuel. For example, the airflow may be decreased to about 0.4 g/s (e.g., where the peak or normal operating conditions air flow rate is about 1.5 g/s). At this low flow rate, remaining carbon or contaminant deposits formed on the catalyst material can be burned off. During this stage, the air is preferably cycled off and on to maintain the temperature within substrate 12 at levels (for example, at about 750° C. to about 850° C.) that will not adversely affect the catalyst. The process limits the availability of oxygen in the catalytic substrate and uses the heat capacity of the catalyst substrate to avoid excessive increases in temperature. An exemplary shutdown process flow for a 63 mm diameter catalytic substrate is shown in Table II.

TABLE II

| Mode | Oxidant flow Rate (g/s) | $T_e$ (next mode) |
| --- | --- | --- |
| (a) Burn-off | 0.4, 0.5, 0.6, . . . | $\geq 800°$ C. (b) |
| | | $\leq 720°$ C. (c) |
| (b) Cool | 0 | $\leq 750°$ C. (a) |
| (c) Final burn-off | 1.0 | $\leq 600°$ C. (exit) |

The process includes cycling the oxidant off and on at flow rates less than the peak flow rate. A suitable airflow through the reformer system is shown by curves 222 and 224 resulting in a temperature profile as shown by curve 220. The particular airflow pattern employed was 0, 0.4, 0, 0.5, 0, 0.6, 0, 0.7, and 1.0 (g/s). While the airflow pattern is shown as an escalating square wave, the pattern is not intended to be limited to the particular escalating square wave pattern. Other periodic patterns producing similar results (i.e., removal of contaminants) may include ramped or level portions. In a preferred embodiment, the pattern is selected to burn-off the carbon at a regulated, controllable rate that avoids excessive temperatures in the catalyst substrate. It should be noted that more elaborate methods using thermal models of the reformer catalyst and carbon combustion in air could be used. The process can be generalized to include other patterns of continuous or stepped changes in airflow with the equivalent effect of slow burn-off. Limiting the available oxygen and using the heat capacity of the catalyst substrate can avoid excessive increases in temperature that could damage the substrate and/or catalyst and/or washcoat materials.

Advantageously, the temperature and reaction control system prevents catalyst degradation caused by build-up of carbon and other particulate matter. Moreover, the system prevents excessive temperature spikes when the carbon and other particulate matter are removed. The removal may be affected by any of the embodiments disclosed herein, individually or sequentially.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A process for operating a reformer system, the process comprising:

introducing to the reformer system a gas mixture comprising fuel and oxidant at a first gas mixture flow rate and a first oxidant:fuel ratio, and operating the reformer system at said first gas mixture flow rate and first oxidant:fuel ratio; and then increasing the oxidant:fuel ratio and reducing the gas mixture flow rate to increase a temperature in the reformer system, wherein the temperature is effective to remove a contaminant from the reformer system.

2. The process according to claim 1, further comprising the steps of:

monitoring a reformer system temperature;

reducing the flow rate of the oxidant when the temperature is greater than or equal to the first temperature; and increasing the flow rate of the oxidant into the reformer system when the temperature is less than or equal to a second temperature, which second temperature is less than a first temperature.

3. The process according to claim 1, wherein the oxidant is selected from the group consisting of air, water, carbon dioxide, and combinations comprising at least one of the foregoing oxidants.

4. The process according to claim 1, wherein the contaminant comprises carbonaceous material.

5. The process according to claim 1, wherein increasing the oxidant:fuel ratio in the gas mixture and reducing the flow rate of the gas mixture produces a peak operating temperature in the reformer system at a distance of less than about 10 millimeters from an inlet of a reformer zone.

6. The process according to claim 1, wherein increasing the oxidant:fuel ratio in the gas mixture and reducing the flow rate of the gas mixture produces a peak operating temperature in the reformer system at a distance of less than about 7 millimeters from an inlet of a reformer zone.

7. The process according to claim 1, wherein increasing the oxidant:fuel ratio in the gas mixture and reducing the flow rate of the gas mixture produces a peak operating temperature in the reformer system at a distance of less than about 5 millimeters from an inlet of a reformer zone.

8. The process according to claim 2, wherein reducing the flow rate of the oxidant comprises reducing the flow rate to zero.

9. The process according to claim 2, further comprising repeatedly steps of increasing the flow rate of the oxidant into the reformer system and then reducing the flow of the oxidant until greater than or equal to about 80 percent of the contaminants present within the reformer system are removed.

10. The process according to claim 2, further comprising repeated steps of increasing the flow rate of the oxidant into the reformer system and then reducing the flow of the oxidant until the temperature is at a third temperature that remains at or below the second temperature.

11. The process according to claim 2, wherein monitoring the temperature comprises modeling a temperature profile using parameters selected from the group consisting of a predetermined flow rate of the gas mixture, a measured flow rate of the gas mixture, an inlet temperature of the gas mixture prior to reacting the gas mixture to form a reformate stream, an estimate of an exit temperature, thermal losses from operating the reformer system, and combinations comprising at least one of the foregoing parameters.

12. The process according to claim 2, wherein the first temperature is less than or equal to about 1,000° C.

13. The process according to claim 5, wherein the peak operating temperature is at about 800° C. to about 1,000° C.

14. The process according to claim 10, further comprising shutting down the reformer system when the temperature remains at or below the third temperature.

15. The process according to claim 10, wherein, for each successive step of increasing the flow rate of oxidant into the reformer system, the flow rate of the oxidant into the reformer system is higher than the flow rate of oxidant for each previous step of increasing the oxidant flow rate.

16. The process according to claim 10, wherein repeating flowing the oxidant into the reformer system and reducing the flow of the oxidant forms a periodic flow pattern.

17. The process according to claim 1, wherein the operating temperature is about 50° C. to about 150° C. greater than a normal operating temperature.

18. The process according to claim 17, wherein the normal operating temperature is about 750° C. to about 950° C.

19. The process according to claim 10, wherein reducing the flow rate of the oxidant comprises reducing the flow rate to zero.

20. The process according to claim 11, wherein reducing the flow rate of the oxidant comprises reducing the flow rate to zero.

21. The process according to claim 11, wherein, for each successive step of increasing the flow rate of oxidant into the reformer system, the flow rate of the oxidant into the reformer system is higher than the flow rate of oxidant for each previous step of increasing the oxidant flow rate.

22. A process for operating a reformer system, the process comprising:
introducing a gas mixture to the reformer system and contacting an oxidant in the gas mixture with a catalyst material disposed at an inlet to the reformer system to generate a reformate stream and to increase a temperature in the reformer system, wherein the temperature is effective to remove a contaminant from the reformer system;
monitoring an operating temperature of the reformer system;
increasing a proportion of the oxidant in the gas mixture and controlling a flow rate of the gas mixture to produce a peak operating temperature in the reformer system at a distance of less than or equal to about 10 millimeters from the inlet;
reducing the flow rate of a fuel in the gas mixture to zero and flowing the oxidant into the reformer system when the operating temperature is less than or equal to a first temperature; and
reducing the flow of the oxidant to zero when the operating temperature is greater than or equal to a second temperature, wherein the second temperature is greater than the first temperature.

23. The process according to claim 22, wherein the distance is less than or equal to about 7 millimeters.

24. The process according to claim 22, wherein the distance is less than or equal to about 5 millimeters.

25. A process for operating a reformer system, the process comprising:
monitoring an operating temperature of the reformer system;
reducing a flow of a fuel in a gas mixture into the reformer system to zero when the operating temperature of the reformer system is greater than or equal to a first temperature;
flowing an oxidant into the reformer system when the operating temperature of the reformer system is less than or equal to a second temperature;
reducing the flow of the oxidant when the operating temperature is greater than or equal to the first temperature;
repeating flowing the oxidant into the reformer system and reducing the flow of the oxidant to zero until the operating temperature is at a third temperature that remains at or below the first temperature; and
shutting down the reformer system when the operating temperature remains at or below the third temperature.

26. The process according to claim 25, wherein reducing the flow rate of the gas mixture comprises reducing the flow rate to zero.

27. The process according to claim 25, wherein reducing the flow rate of the oxidant comprises reducing the flow rate to zero.

* * * * *